United States Patent [19]
Davenport et al.

[11] Patent Number: 5,343,367
[45] Date of Patent: Aug. 30, 1994

[54] PROJECTION HEADLAMP SYSTEM HAVING DIRECT OPTICAL COUPLING OF LIGHT DISTRIBUTION ELEMENTS WITH DISCHARGE ARC LIGHT SOURCE

[75] Inventors: John M. Davenport, Lyndhurst; Richard L. Hansler, Pepper Pike; Kenneth S. King, Willoughby Hills, all of Ohio

[73] Assignee: General Electric Company, Schenectady, N.Y.

[21] Appl. No.: 990,400

[22] Filed: Dec. 14, 1992

[51] Int. Cl.$^5$ ............................................. F21V 8/00
[52] U.S. Cl. ........................................ 362/32; 362/61; 385/39
[58] Field of Search ............... 362/32, 61, 80; 385/38, 385/50, 51

[56] References Cited
U.S. PATENT DOCUMENTS

| | | | |
|---|---|---|---|
| 4,811,171 | 3/1989 | Viola | 362/80 |
| 4,811,172 | 3/1989 | Davenport et al. | 362/32 |
| 4,958,263 | 9/1990 | Davenport et al. | 362/61 |
| 4,977,487 | 12/1990 | Okano | 362/80 |
| 5,184,882 | 2/1993 | Davenport et al. | 362/32 |
| 5,184,883 | 2/1993 | Davenport et al. | 362/32 |
| 5,199,091 | 3/1993 | Davenport et al. | 385/39 |

*Primary Examiner*—Richard R. Cole
*Attorney, Agent, or Firm*—George E. Hawranko; Stanley C. Corwin

[57] ABSTRACT

A projection headlamp system for a vehicle includes a high beam subsystem and a low beam subsystem. Each of the high and low beam subsystems includes a pair of light pattern projecting arrangements, a remote single arc discharge light source, a pair of solid optical coupling devices, and a pair of elongated light distributing conductors coupled at output ends to the pair of light pattern projecting arrangements and coupled at input ends to the pair of solid optical coupling devices. The high and low beam subsystems employ either separate single arc discharge light sources or a common single arc discharge light source.

13 Claims, 2 Drawing Sheets

PROJECTION HEADLAMP SYSTEM HAVING DIRECT OPTICAL COUPLING OF LIGHT DISTRIBUTION ELEMENTS WITH DISCHARGE ARC LIGHT SOURCE

CROSS-REFERENCE TO A RELATED APPLICATION

Reference is hereby made to the following copending U.S. patent applications dealing with related subject matter and assigned to the assignee of the present invention:

1. "An Arrangement And A Method For Coupling A Light Source To A Light Guide Using A Solid Optical Coupler" by John M. Davenport et al, assigned U.S. Ser. No. 07/806,381 and filed Dec. 13, 1991 now U.S. Pat. No. 5,199,091.
2. "Projection Headlamp Lighting System Using Different Diameter Optical Light Conductors" by John M. Davenport et al, assigned U.S. Ser. No. 07/756,663 and filed Sep. 9, 1991 now U.S. Pat. No. 5,184,882.

BACKGROUND OF THE INVENTION

Field of the Invention

The present invention relates generally to projection headlamp lighting systems and, more particularly, to a high and low beam projection headlamp system having direct optical coupling of light distribution elements with a remote arc discharge light source.

Description of the Prior Art

It is well known that optical light conductors, such as light guide fibers, or fiber optics, may be used efficiently to carry or conduct the output of a light source to various locations without encountering any substantial transmission losses of the light. The light carried by the optical conductors is confined or condensed to the relatively small dimensions of the conductors themselves and is adaptable for use in various related space restrictive applications in automobiles and aircraft or other vehicles concerned with aerodynamic styling and efficiency.

For Example, automotive styling must take into account the amount of frontal area necessary to provide the forward illumination needs for the automobile and provides means to reduce the area, and in particular, the height so as to satisfy aerodynamic considerations. The use of optical light conductors that conduct light within small confines are adaptable to these aerodynamic considerations. Further, optical conductors are advantageously adaptable to provide the overall illumination needs of the vehicle.

To reduce overall space requirements for vehicle forward illumination, one known projection headlamp lighting system employs a remote single arc discharge light source to generate light, a light distribution arrangement composed of a plurality of optical light conductors to distribute the light to the various lighting positions, and a light projection arrangement composed of optical elements at the lighting positions to receive the light from the optical light conductors and project the light in the desired pattern. This projection headlamp lighting system is disclosed in U.S. Pat. Nos. 4,811,172 and 4,958,263 issued to Davenport et al and assigned to the same assignee as the present invention. The remote single, arc discharge light source can be of the type described in U.S. Pat. No. 4,958,263. The optical light conductors of the distribution arrangement can be a bundle of optical light guide fibers broken out and distributed as necessary. The light projection arrangement of optical elements can be an array of optical connectors, lens, and mask elements as described in U.S. Pat. Nos. 4,868,718 and 4,949,227 issued respectively to Davenport et al and Finch et al and assigned to the same assignee as the present invention. One design objective attained by this projection lighting system is a substantial reduction in the amount of space needed to achieve proper vehicle forward illumination since there is no longer a need to have individual light source assemblies for up to four light source positions.

While the aforementioned projection headlamp system employing a remote single, arc discharge light source has certain advantages, it still suffers from the disadvantage of being relatively complex and expensive compared to a standard incandescent headlamp system. Consequently, the need still remains for improvements which will foster the practical application of such projection headlamp system.

SUMMARY OF THE INVENTION

The present invention provides a headlamp system designed to satisfy the aforementioned needs. The projection headlamp system of the present invention comprises high and low beam subsystems which each separately, or in common, utilizes a remote single, arc discharge light source whose light output is optically coupled directly with a pair of light distributing conductors extending along different paths away from the discharge arc light source to locations for providing illumination forwardly of the vehicle. The direct optical coupling of the arc discharge light source in the high and low beam subsystems provides a less complex and less costly arrangement than that of the prior patented projection headlamp system.

Accordingly, the present invention is directed to a projection headlamp system which comprises a pair of high and low beam subsystems. Each of the high and low beam subsystems includes: (a) an arc discharge light source for generating light; (b) a pair of arrangements for receiving light at spaced preselected lighting positions and for projecting the light in desired light patterns; (c) a pair of elongated light distributing conductors each having an input end and an output end such that the light conductors receive light at the input ends thereof and distribute the light at the output ends thereof to the projecting arrangements disposed at the lighting positions; and (d) a pair of solid optical coupler devices constructed of a material having a high transmittance value in the visible light range, each coupler device having an input end and an output end. The output end of each coupler device is coupled to the input end of one of the light distributing conductors. The input ends of the coupler devices together define a cavity which receives the arc discharge light source so as to couple the light source to the coupler devices such that light from the light source is transmitted directly into the solid optical coupler devices.

Further, the high and low beam subsystems employ either separate single arc discharge light sources or a common single arc discharge light source. In the case where the subsystems employ a common light source, means are provided to move the light source in an alternating fashion between the subsystems. The light source preferably is a low wattage metal halide tube. Each of the light projecting arrangements includes a lens. Each of the light conductors preferably includes a bundle of optical fibers.

More particularly, each solid optical coupling device is a body having a generally rectangular cross-sectional configuration and a pair of opposite input and output ends and a pair of opposite sides extending between and interconnecting the opposite ends. The input end has a semi-hexagonal recessed surface defined thereon providing one-half of the cavity receiving the light source. The output end has a generally planar surface defined thereon having a length greater than the length between opposite edges of the recessed surface at the input end. The opposite sides of the device include successive flat planar surfaces which converge toward one another going from the output end to the input end of the device. Each succeeding side surface is angularly displaced from the plane of the preceding side surface by an angle of less than twenty degrees. The coupling device also has a pair of generally parallel top and bottom surfaces extending between and interconnecting the opposite end and side surfaces.

These and other features and advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which.

DETAILED DESCRIPTION OF THE INVENTION

Figure 1:
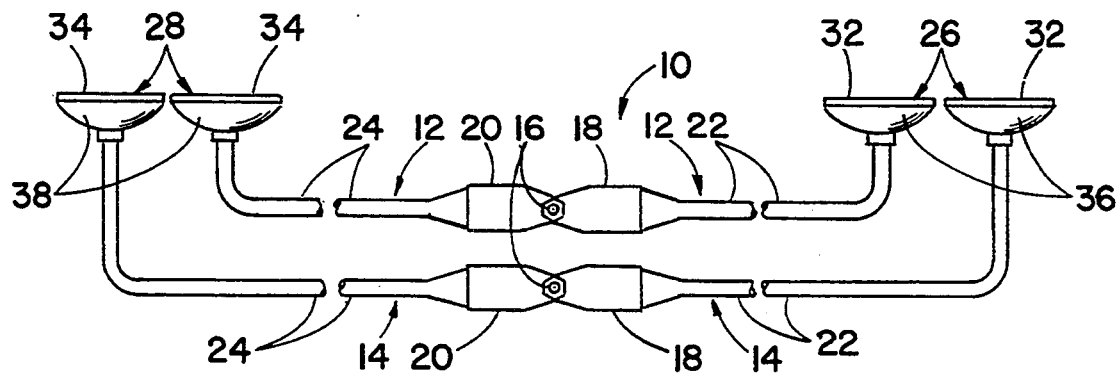
FIG. 1 is a top plan view of one embodiment of a projection headlamp system in accordance with the principles of the present invention.
Figure 2:
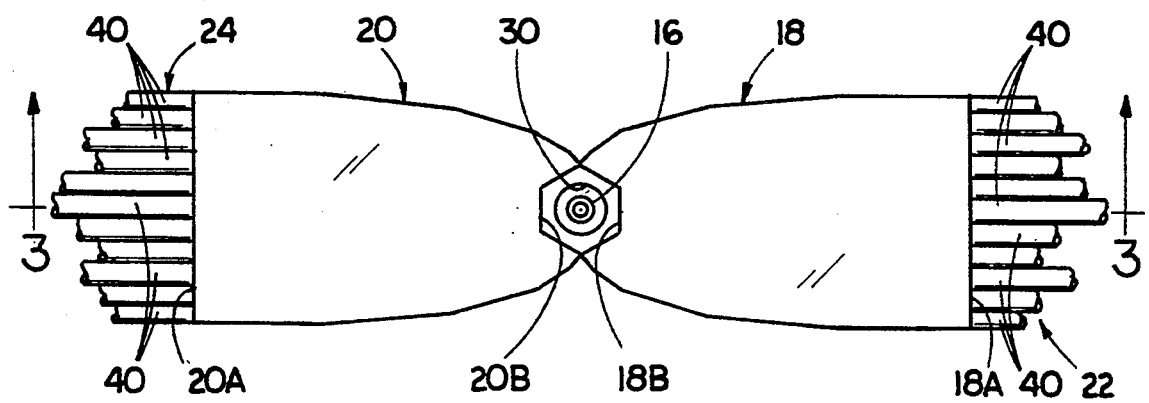
FIG. 2 is an enlarged top plan view of a pair of solid optical couplers and an arc discharge light source of the projection headlamp system of FIG. 1.
Figure 3:
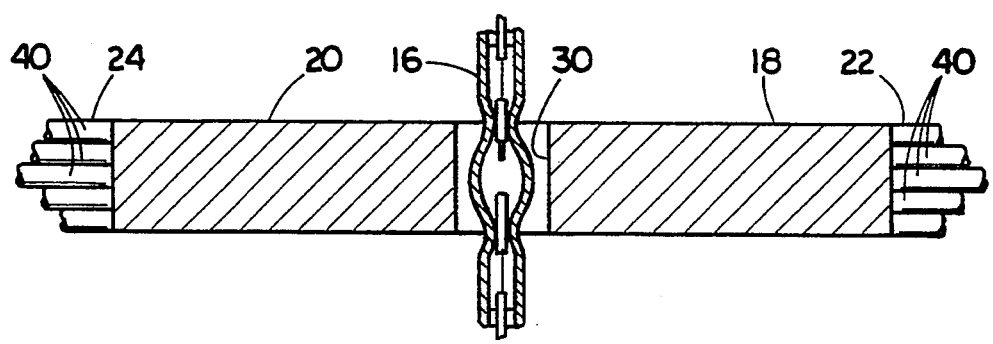
FIG. 3 is an axial sectional view taken along line 3—3 of FIG. 2.

In the following description, like reference characters designate like or corresponding parts throughout the several views. Also in the following description, it is to be understood that such terms as "forward", "rearward", "right", "upwardly", "downwardly", and the like, are words of convenience and are not to be construed as limiting terms.

Referring now to the drawings, and particularly to FIG. 1, there is illustrated a projection headlamp system, generally designated 10, for automobiles and other vehicles constructed in accordance with the present invention. The projection headlamp system 10 basically includes a pair of high and low beam subsystems 12, 14. Each of the high and low beam subsystems 12, 14 includes an arc discharge light source 16, a pair of solid optical coupler devices 18, 20, a pair of elongated light distributing conductors 22, 24 and a pair of light projecting arrangements 26, 28.

The arc discharge light source 16 preferably is a low wattage metal halide arc tube operated by a single ballast (not shown). Each solid optical coupler device 18, 20 is constructed of a material having a high transmittance value in the visible light range, preferably the material is quartz. Each coupler device 18, 20 at an output end 18A, 20A is coupled to an input end of one of the light distributing conductors 22, 24. At input ends 18B, 20B, the coupler devices 18, 20 are fitted together so as to define a cavity 30 therebetween which receives the arc discharge light source 16. The arc discharge light source 16 is mounted vertically through the cavity 30 and is immediately surrounded by the input ends 18B, 20B of the coupler devices 18, 20 so as to optically couple the light source 16 to the coupler devices such that light from the light source 16 is transmitted directly into the solid optical coupler devices 18, 20. To prevent any reflections, the input ends 18A, 20A of the coupler devices 18, 20 could be coated with a suitable anti-reflection coating. For a detailed description of a suitable arc discharge light source and pair of coupler devices which can be employed in the projection headlamp system 10 of the present invention, attention is directed to the first patent application cross-referenced above, the disclosure of which is incorporated herein by reference thereto.

The light collected by the solid optical coupler devices 18, 20 travels through the coupler devices by a total internal reflection mode and is transmitted from their output ends 18A, 20A into the input ends 22A, 24A of the respective light distributing conductors 22, 24. The light distributing conductors 22, 24 conduct and guide the light to spaced preselected lighting positions, such as right and left positions on the front of an automobile, at which are located the light projecting arrangements 26, 28. At the preselected positions, the light passes through the output ends of the light distributing conductors 22, 24 to the input ends of the light projecting arrangements 26, 28 disposed at the lighting positions. The light projecting arrangements 26, 28 are configured to project the light forwardly in the desired high and low beam light patterns. In the preferred embodiment, the light projecting arrangements 26, 28 include respective lenses 32, 34 and flared connectors 36, 38. The light distributing conductors 22, 24 include respective bundles of optical fibers 40 whose input ends are attached to the outputs ends of the coupler devices 18, 20. For a detailed description of a suitable light projecting arrangement which can be employed in the projection headlamp system 10 of the present invention, attention is directed to the second patent application cross-referenced above, the disclosure of which is incorporated herein by reference thereto.

Figure 4:
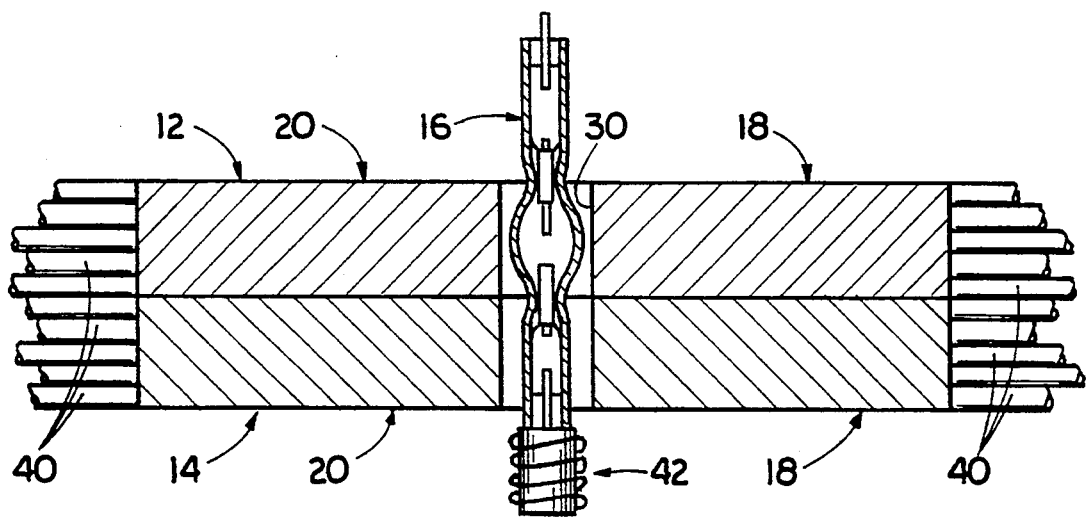
FIG. 4 is a view similar to that of FIG. 3 illustrating a modified embodiment of the projection headlamp system of the present invention.

Further, the high and low beam subsystems 12, 14 employ either separate single arc discharge light sources 16, as shown in FIG. 1, or the single arc discharge light source 16 in common, as shown in FIG. 4. In the latter case where the subsystems 12, 14 employ the light source 16 in common, means in the form of an electrical solenoid actuator 42 or some other suitable mechanism are provided to move the light source 16 in an alternating fashion between the subsystems. In this embodiment, the high and low beam subsystems 12, 14 are stacked one above the other such that the light source 16 can be moved between the subsystems 12, 14 in order to switch the system 10 between high and low beam operation. An advantage of this arrangement is that the light 16 does not extinguish between low and high beams, but moves smoothly from one to the other.

Figure 5:
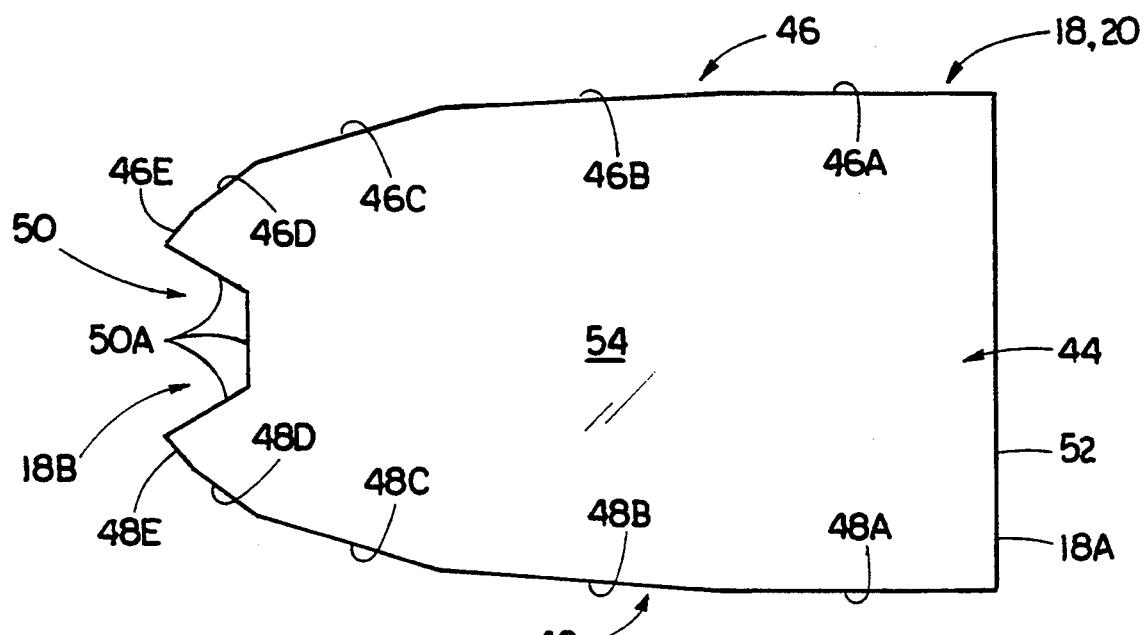
FIG. 5 is an enlarged top plan view of one of the solid optical coupling devices of the projection headlamp system of the present invention.
Figure 6:
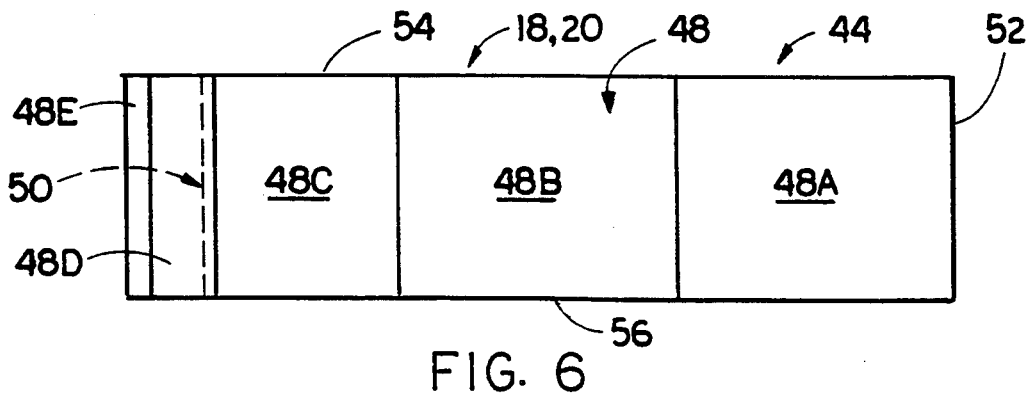
FIG. 6 is a side elevational view of the solid optical coupling device as seen in FIG. 5.

Referring to FIGS. 5 and 6, each solid optical coupling device 18, 20 includes a body 44 having a generally rectangular cross-sectional configuration and the pair of opposite input and output ends 18B, 18A and 20B, 20A and a pair of opposite sides 46, 48 extending between and interconnecting the opposite ends. The input end 18B, 20B has a semi-hexagonal recessed surface 50 defined thereon providing one-half of the cavity 30 receiving the light source 16. The output end 18A, 20A has a generally planar surface 52 defined thereon having a length greater than the length between opposite edges 50A of the recessed surface 50 at the input end 18B, 20B. The opposite sides 46, 48 of the coupler device 18, 20 include successive flat planar surfaces 46A–46E, 48A–48E which converge toward one another going from the output end 18A, 20A to the input end 18B, 20B of the coupler device 18, 20. Each succeeding side surface 46A–46E, 48A–48E is angularly displaced from the plane of the preceding side surface by an angle of less than twenty degrees, specifically approximately, 4°, 13°, 19°, and 15°. The coupling device 18, 20 also has a pair of generally parallel top and bottom surfaces 54, 56 extending between and interconnecting the opposite end and side surfaces.

It is thought that the present invention and many of its attendant advantages will be understood from the foregoing description and it will be apparent that various changes may be made in the form, construction and arrangement of the parts thereof without departing from the spirit and scope of the invention or sacrificing all of its material advantages, the forms hereinbefore described being merely preferred or exemplary embodiments thereof.

We claim:

1. A projection headlamp system for a vehicle comprising:
    (a) an arc discharge light source for generating light;
    (b) a pair of arrangements for receiving light at spaced preselected lighting positions and for projecting the light in desired light patterns;
    (c) a pair of elongated light distributing conductors each having an input end and an output end, said light conductors receiving light at said input ends thereof and distributing the light at said output ends thereof to said projecting arrangements at said lighting positions;
    (d) a pair of solid optical coupler devices constructed of a material having a high transmittance value in the visible light range, each of said coupler device having an input end and an output end, said output end of each said coupler device being coupled to said input end of one of said light distributing conductors, said input ends of said coupler devices together defining a cavity receiving said arc discharge light source so as to couple said light source to said coupler devices such that light from said light source is transmitted directly into said solid optical coupler devices; and,
    (e) wherein each said solid optical coupler device includes a body having said opposite input and output ends and a pair of opposite sides extending between and interconnecting said opposite ends, said opposite sides of said body including successive flat planar surfaces which converge toward one another going from said output end to said input end of said device, and further, wherein said each succeeding side surface is angularly displaced from a plane of a preceding side surface by an angle of less than twenty degrees.

2. The system as recited in claim 1, wherein each of said solid optical coupler devices includes a body having a semi-hexagonal recessed surface defined in said input end thereof forming approximately one-half of said cavity of said coupler devices receiving said arc discharge light source.

3. The system as recited in claim 2, wherein said body of each of said solid optical coupler devices has a generally rectangular cross-sectional configuration.

4. The system as recited in claim 1, wherein said output end of each of said solid optical coupler devices has a generally planar surface defined thereon having a length greater than the length between opposite edges of said recessed surface at said input end.

5. The system as recited in claim 1, wherein said device also has a pair of generally parallel top and bottom surfaces extending between and interconnecting said opposite end and side surfaces.

6. The system as recited in claim 1, wherein said light source is low wattage metal halide tube.

7. A discharge headlamp system for a vehicle, comprising:
    (a) a high beam subsystem; and
    (b) a low beam subsystem;
    (c) each of said high and low beam subsystems including:
        (i) and arc discharge light source for generating light,
        (ii) a pair of arrangements for receiving light at spaced preselected lighting positions and for projecting the light in desired light patterns,
        (iii) a pair of elongated light distributing conductors each having an input end and an output end, said light conductors receiving light at said input ends thereof and distributing the light at said output ends thereof to said projecting arrangements at said lighting positions;
        (iv) a pair of solid optical coupler devices constructed of a material having a high transmittance value in the visible light range, each coupler device having an input end and an output end, said output end of each said coupler device being coupled to said input end of one of said light distributing conductors, said input ends of said coupler devices together defining a cavity receiving said arc discharge light source so as to couple said light source to said coupler devices such that light from said light source is transmitted directly into said solid optical coupler devices; and,
        (v) wherein each said solid optical coupler device includes a body having said opposite input and output ends and a pair of opposite sides extending between and interconnecting said opposite ends, said opposite sides of said body including successive flat planar surfaces which converge toward one another going from said output end to said input end of said device, and further, wherein said each succeeding side surface is angularly disposed from a plane of a preceding side surface by an angle of less than twenty degrees.

8. The system as recited in claim 7, wherein each of said solid optical coupler devices includes a body having a semi-hexagonal recessed surface defined in said input end thereof forming approximately one-half of said cavity of said coupler devices receiving said arc discharge light source.

9. The system as recited in claim 8, wherein said body of each of said solid optical coupler devices has a generally rectangular cross-sectional configuration.

10. The system are recited in claim 7, wherein said output end of each of said solid optical coupler devices has a generally planar surface defined thereon having a length greater than the length between opposite edges of said recessed surface at said input end.

11. The system as recited in claim 7, wherein said device also has a pair of generally parallel top and bottom surfaces extending between and interconnecting said opposite end and side surfaces.

12. The system as recited in claim 7, wherein said arc discharge light source is common to both said high and low beam subsystems.

13. The system as recited in claim 7, wherein said arc discharge light source of said high beam subsystem is separate from said arc discharge light source of said low beam subsystem.

* * * * *